United States Patent [19]

VanAckeren

[11] Patent Number: 5,279,491
[45] Date of Patent: Jan. 18, 1994

[54] MOLDING APPARATUS INCLUDING CORE FOR MOLDING ZERO-DRAFT HOLE

[75] Inventor: Timothy J. VanAckeren, Milwaukee, Wis.

[73] Assignee: Outboard Marine Corporation, Waukegan, Ill.

[21] Appl. No.: 890,647

[22] Filed: May 28, 1992

[51] Int. Cl.⁵ .................. B29C 33/10; B29C 33/76
[52] U.S. Cl. ............................. 249/141; 249/153; 249/179; 425/468; 425/812
[58] Field of Search .............. 249/35, 63, 64, 141, 249/142, 150, 152, 153, 157, 178, 179, 183, DIG. 2; 425/468, 812

[56] References Cited

U.S. PATENT DOCUMENTS

| | | | |
|---|---|---|---|
| 278,551 | 5/1883 | Hoopes et al. | 249/63 |
| 839,818 | 1/1907 | De Lhorbe | 249/179 |
| 859,681 | 7/1907 | Morris | 249/179 |
| 948,540 | 2/1910 | Clark | 249/179 |
| 955,235 | 4/1910 | Wellman | 249/63 |
| 1,023,429 | 4/1912 | Kempf | 249/179 |
| 1,047,102 | 12/1912 | Meinken | 249/179 |
| 1,246,532 | 11/1917 | Bosma | 249/177 |
| 1,356,714 | 10/1920 | Hachmann | 249/141 |
| 1,455,039 | 5/1923 | Bonelli | 249/153 |
| 1,586,603 | 11/1923 | Brown | 249/179 |
| 1,624,712 | 4/1927 | Berridge | 249/179 |
| 1,996,678 | 4/1935 | Leggat et al. | 249/152 |
| 2,541,950 | 2/1951 | Tomlinson | 249/153 |
| 2,882,582 | 4/1959 | McLennan | 249/152 |
| 3,352,529 | 11/1967 | Haas | 249/152 |
| 4,771,981 | 9/1988 | Little et al. | 249/63 |
| 4,915,609 | 4/1990 | Hahn et al. | 249/141 |

*Primary Examiner*—Jay H. Woo
*Assistant Examiner*—James P. Mackey
*Attorney, Agent, or Firm*—Michael, Best & Friedrich

[57] ABSTRACT

A molding apparatus including at least two mold parts movable relative to each other between an open position and a closed position, the mold parts defining, when in the closed position, a mold cavity having the shape of an object to be molded, and an expandable and contractible core member for molding the object with a zero-draft opening.

21 Claims, 2 Drawing Sheets

MOLDING APPARATUS INCLUDING CORE FOR MOLDING ZERO-DRAFT HOLE

BACKGROUND OF THE INVENTION

The invention relates to molding apparatus, and more particularly to such apparatus including means for forming a hole or opening in the object being molded.

It is known to use a core to form a hole or opening in an object being molded. The core usually has one or two degrees of draft to allow removal of the core without damaging the molded object. It is also known to use an expandable and contractible core in some molding applications to produce a zero-draft opening.

Attention is directed to the following U.S. Pat. Nos.:
839,818
1,047,102
859,681
1,246,532
948,540
1,586,603
1,023,429
1,624,712

SUMMARY OF THE INVENTION

The invention provides a molding apparatus comprising at least two mold parts movable relative to each other between an open position and a closed position,, the mold parts defining, when in the closed position,, a mold cavity having the shape of an object to be molded, and means for molding the object with a zero-draft opening, the means including an expandable and contractable core member having one end fixed to one of the mold parts.

The invention also provides a molding apparatus comprising at least two mold parts movable relative to each other between an open position and a closed position, the mold parts defining, when in the closed position, a mold cavity having the shape of an object to be molded,, and first means for molding the object with a zero-draft opening, the first means including an expandable and contractible core member, and second means for causing expansion of the core member in response to closing of the mold parts and for allowing contraction of the core member in response to opening of the mold parts.

The invention also provides a molding apparatus comprising at least two mold parts movable relative to each other between an open position and a closed position, the mold parts defining, when in the closed position,, a mold cavity having the shape of an object to be molded, and means for molding the object with a zero-draft opening, the means including an expandable and contractible core member, the core member being a spirally wrapped tube of resilient material, and the tube including overlapping portions having therein respective vent openings which align when the core member is expanded.

A principal feature of the invention is the provision of an expandable and contractible core fixed to one of the mold parts. The core is thus automatically located when the mold is closed.

Another principal feature of the invention is the provision of means fixed to the other mold part for expanding the core in response to closing of the mold and for allowing contraction of the core in response to opening of the mold. This greatly reduces the labor involved in molding a zero-draft hole.

Another principal feature of the invention is the provision of an expandable and contractible core which is a spirally wrapped tube of resilient material and which includes overlapping portions having therein respective vent openings that align when the core is expanded. This arrangement improves venting of the mold.

Other features and advantages of the invention will become apparent to those skilled in the art upon review of the following detailed description, claims and drawings.

Figure 1:
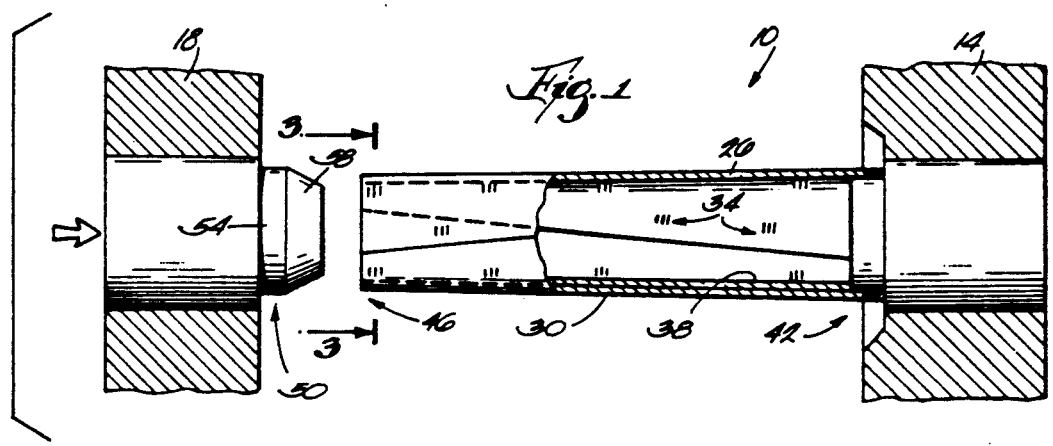
FIG. 1 is a sectional view of a molding apparatus embodying the invention,, with the mold parts shown in their open position.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Figure 2:
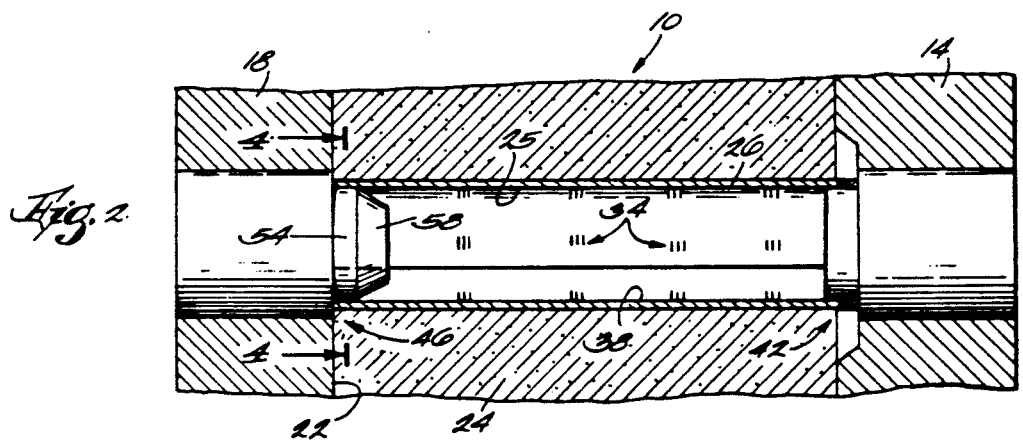
FIG. 2 is a view similar to FIG. 1 with the mold parts shown in their closed position and with an object being molded.

Shown in FIG. 1 of the drawings is a molding apparatus 10 for use in various manufacturing processes. The apparatus comprises at least two mold parts 14 and 18. The mold parts may consist of any acceptable material. This, of course, will vary depending upon the particular manufacturing process utilized. The mold parts are shown in FIG. 1 in an open position. When brought together in a closed position (as shown in FIG. 2), the mold parts define a mold cavity 22 having the shape of an object 24 to be molded.

Figure 3:
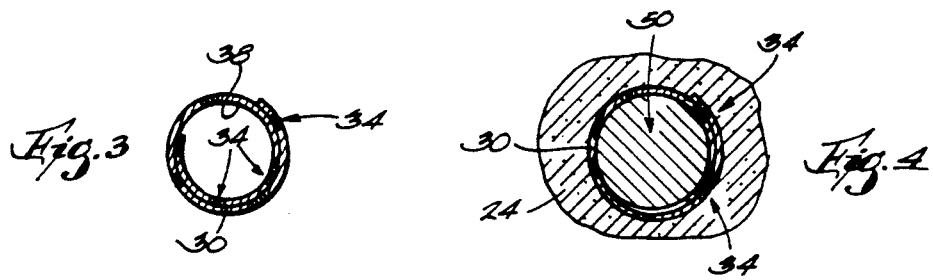
FIG. 3 is a view taken along line 3—3 in FIG. 1.
Figure 4:
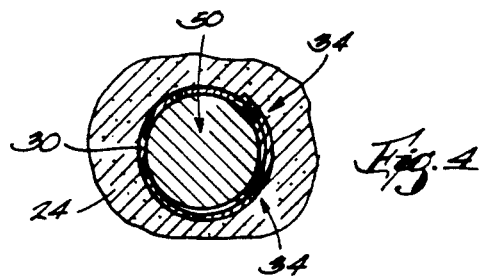
FIG. 4 is a view taken along line 4—4 in FIG. 2.
Figure 5:
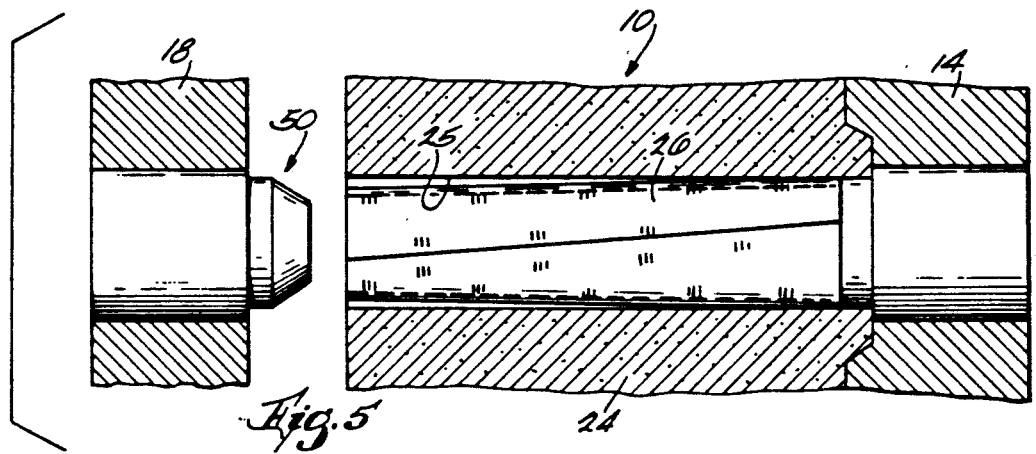
FIG. 5 is a view similar to FIG. 1 showing the mold parts in their open position after molding of the object.
Figure 6:
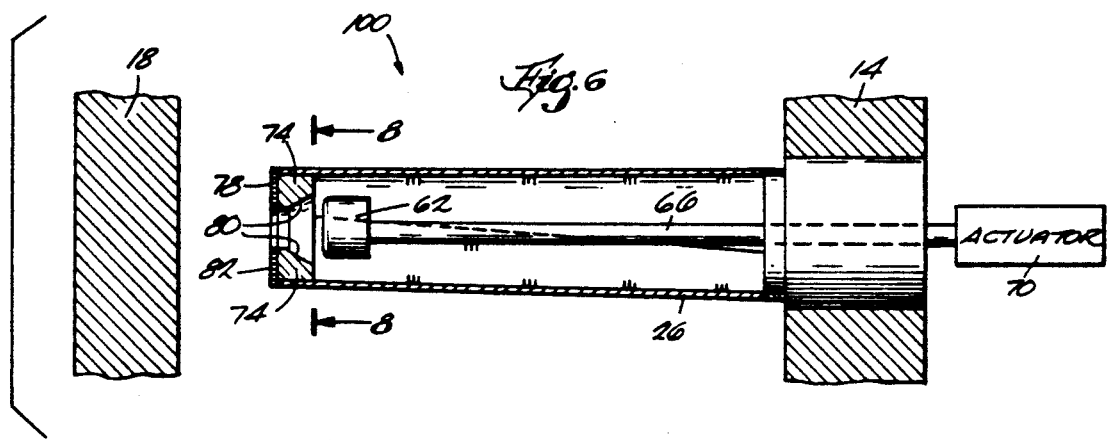
FIG. 6 is a view similar to FIG. 1 showing an alternative embodiment of the invention.
Figure 7:
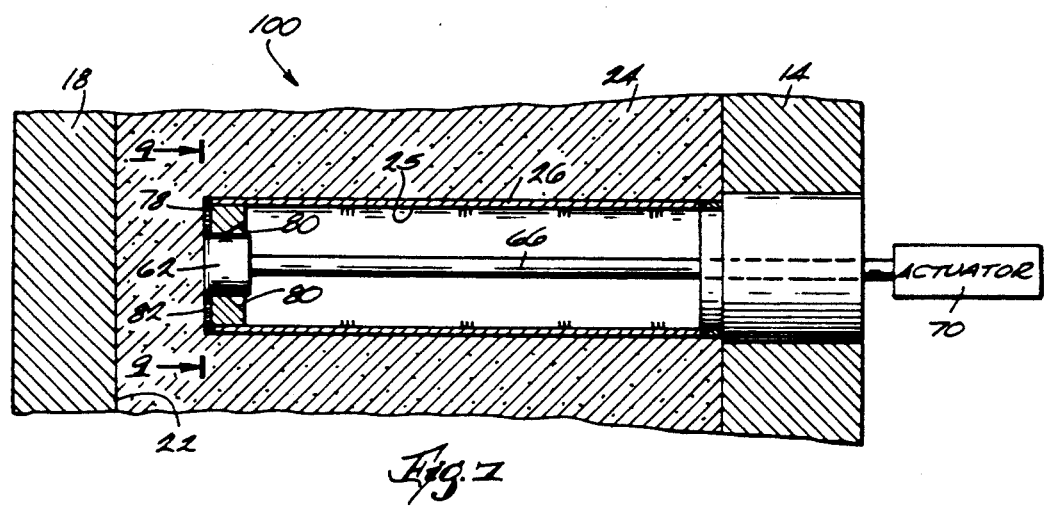
FIG. 7 is a view similar to FIG. 2 of the alternative embodiment shown in FIG. 6.
Figure 8:
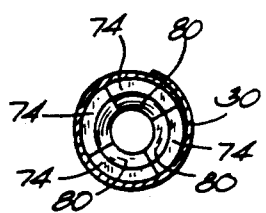
FIG. 8 is a view taken along lines 8—8 in FIG. 6.

The apparatus further comprises means for molding the object 24 with a zero-draft opening 25 (FIG. 5). This means preferably includes (see FIGS. 1-5) an expandable and contractible core member 26. The core member 26 in formed from a sheet or portion 30 of a suitable, spirally-wrapped resilient material which includes regularly spaced vent openings 34. The core member 26 is generally cylindrical and includes a bore 38 (shown best in FIG. 3) extending longitudinally along the center of the cylinder. The core member 26 has opposite right and left ends 42 and 46. The fixed end 42 of the core member 26 is fixed to the mold part 14 and thus has a fixed cross-sectional area.

In contrast, the opposite end 46 of the core member 26 has a cross-sectional area which is expandable and contractible. The ability to expand and contract results from the spirally-wound construction of the resilient material forming the core member 26. This construction naturally creates a helical force which, when the mold parts 14 and 18 are open, causes a difference in the cross-sectional areas of the core member ends 42 and 46. Typically, the cross-sectional area of the end 46 is less than that of the fixed end 42, so that the core member 26 has a draft.

The molding means also includes means fixed to the mold part 18 for causing expansion of the core member 26 in response to closing of the mold parts 14 and 18 and for allowing contraction of the core member 26 in response to opening of the mold parts 14 and 18. This means preferably includes a plug 50 (see FIGS. 1, 2 and 5) fixed to the mold part 18. The plug is comprised of a generally cylindrical base portion 54 fixed to the mold part 18 and a frustoconical portion 58 extending from the base portion 54. In practice, mold part 18, base portion 54, and frustoconical portion 58 may be formed of separate pieces or manufactured as a single piece.

The placement of the plug 50 is such that as the mold parts 14 and 18 are brought together to the closed position (see FIG. 2), the frustoconical portion 58 of the plug 50 enters the core member bore 38 from the left end 46 of the core member 26. As the plug 50 enters the bore, the plug forces the end 46 open, thereby increasing the cross-sectional area of the end 46 of the core member 26. More particularly, the plug 50 causes the cross-sectional area of the end 46 to be equal to that of the end 42, thereby creating a zero-draft core member. Furthermore, when the core member 26 is expanded, as shown in FIG. 4, the vent openings 34 in the overlapping portions of the core member align so as to allow gases to vent from the sold cavity 22 to the longitudinal bore 38 in the core member.

After completion of the molding process,, the mold parts 14 and 18 are separated (shown in FIG. 5). As the mold parts move apart, the plug 50 is withdrawn from the core member bore 38. This results in a decrease in the diameter of the left end 46 of the core member, thereby creating a draft in the core member. The draft causes separation of the core member from the molded object 24, and the object has a zero-draft opening 25.

An apparatus 100 that is an alternative embodiment of the invention is shown in FIGS. 6-9. Except as described below, the apparatus 100 is substantially identical to the apparatus 10. Common elements have been given the same reference numerals.

Instead of a zero-draft through bore, the apparatus 100 provides a zero-draft blind bore. The molding apparatus 100 includes (see FIGS. 6 and 7) means extending inside the core member 26 from the mold part 14 for selectively expanding the core member. The means includes a piston 62 mounted on an actuator rod 66 extending longitudinally along the center of the core member bore 38. The actuator rod 66 is selectively moved along its axis by an actuator 70. The piston 62 moves between a first, disengaged position (shown in FIG. 6) and a second or engaged position (shown in FIG. 7).

Figure 9:
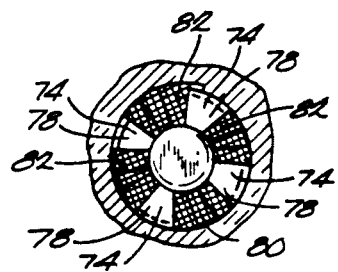
FIG. 9 is a view taken along lines 9—9 in FIG. 7.

The inner surface of the core member 26 has thereon means for expanding the core member in response to movement of the piston 62 to the engaged position. As shown in FIG. 9, the expanding means includes four arcuate members 74 fixed to the core member 26 in the open end 46 of the core member. Each arcuate member includes an outer or end surface 78 flush with the end of the core member 26. Each member 74 also has an inner ramped surface 80. Each member 74 also includes (see FIG. 9) a screen 82 fixed to the outer surface. As the piston 62 moves toward the engaged position,, the piston 62 engages the ramped surfaces 80, thereby causing expansion of the left end 46 of the core member 26. The arcuate members 74 separate from each other during expansion of the core member, and the screens 82 cover the gaps between the separating arcuate members 74 and provide vent openings in the end of the core member. In its engaged position, the piston is flush with the outer surfaces of the members 74. At this point, the cross-sectional area of the left end 46 of the core member is equal to that of the right end 42.

As in the apparatus 10, the vent openings 34 in the apparatus 100 align when the cross-sectional areas of the opposite core member ends 42 and 46 are equal.

When the molding process is complete, the actuator 70 is initiated and the piston 62 is thereby withdrawn from the engaged position to the disengaged position. This causes the end of the core member 26 to contract.

Various features of the invention are set forth in the following claims.

I claim:

1. A molding apparatus comprising at least two mold parts movable relative to each other between an open position and a closed position, said mold parts defining, when in said closed position, a mold cavity having the shape of an object to be molded, and means for molding the object with a zero-draft opening having an axis, said means including an expandable and contractible core member which has one end fixed to one of said mold parts, and means movable axially relative to said core for expanding said core.

2. A molding apparatus comprising at least two mold parts movable relative to each other between an open position and a closed position, said mold parts defining, when in said closed position, a mold cavity having the shape of an object to be molded, and means for molding the object with a zero-draft opening, said means including an expandable and contractible core member having one end fixed to one of said mold parts, and means fixed to an other of said mold parts for causing expansion of said core member in response to closing of said mold parts and for allowing contraction of said core member in response to opening of said mold parts.

3. Apparatus as set forth in claim 2 wherein said core member has an open opposite end, and wherein said second means includes a plug which is mounted on said other of said mold parts and which extends, in response to closing of said mold parts, into said opposite end so as to expand said core member.

4. Apparatus as set forth in claim 1 wherein said one end of said core member has a fixed cross-sectional area.

5. Apparatus as set forth in claim 1 wherein said core member is a spirally wrapped tube of resilient material.

6. A molding apparatus comprising at least two mold parts movable relative to each other between an open position and a closed position, said mold parts defining, when in said closed position, a mold cavity having the shape of an object to be molded, and means for molding the object with a zero-draft opening, said means including an expandable and contractible core member having one end fixed to one of said mold parts and comprising a spirally wrapped tube which is of resilient material and which includes overlapping portions having therein respective vent openings which are aligned when said core member is expanded.

7. A molding apparatus comprising at least two mold parts movable relative to each other between an open position and a closed position, said mold parts defining, when in said closed position, a mold cavity having the shape of an object to be molded, and means for molding the object with a zero-draft blind opening, said means including an expandable and contractible core member having one end fixed to one of said mold parts, and means extending inside said core member from said one of said mold parts for selectively expanding said core member.

8. Apparatus as set forth in claim 7 wherein said expanding means includes a piston movable between an engaged position and a disengaged position, and wherein said molding means also includes means for expanding said core member in response to movement of said piston to said engaged position.

9. A molding apparatus comprising at least two mold parts movable relative to each other between an open position and a closed position, said mold parts defining, when in said closed position, a mold cavity having the shape of an object to be molded, first means for molding the object with a zero-draft opening, said first means including an expandable and contractible core member, and second means for causing expansion of said core member in response to closing of said mold parts and for allowing contraction of said core member in response to opening of said mold parts.

10. Apparatus as set forth in claim 9 wherein said core member has one end fixed to one of said mold parts, and wherein said second means is fixed to an other of said mold parts.

11. Apparatus as set forth in claim 10 wherein said one end of said core member has a fixed cross-sectional area.

12. Apparatus as set forth in claim 10 wherein said core member has an open opposite end, and wherein said second means includes a plug which is mounted on said other of said mold parts and which extends, in response to closing of said mold parts, into said opposite end so as to expand said core member.

13. Apparatus as set forth in claim 9 wherein said core member is a spirally wrapped tube of resilient material.

14. Apparatus as set forth in claim 13 wherein said tube includes overlapping portions having therein respective vent openings, and wherein said vent openings align when said core member is expanded.

15. A molding apparatus comprising at least two mold parts movable relative to each other between an open position and a closed position, said mold parts defining, when in said closed position, a mold cavity having the shape of an object to be molded, and means for molding the object with a zero-draft opening, said means including an expandable and contractible core member, said core member being a spirally wrapped tube of resilient material, and said tube including overlapping portions having therein respective vent openings which align when said core member is expanded.

16. Apparatus as set forth in claim 15 wherein said means also includes second means for causing expansion of said core member in response to closing of said mold parts and for allowing contraction of said core member in response to opening of said mold parts.

17. Apparatus as set forth in claim 16 wherein said core member has one end fixed to one of said mold parts, and wherein said second means is fixed to an other of said mold parts.

18. Apparatus as set forth in claim 17 wherein said one end of said core member has a fixed cross-sectional area.

19. Apparatus as set forth in claim 18 wherein said core member has an open opposite end, and wherein said second means includes a plug which is mounted on said other of said mold parts and which extends, in response to closing of said mold parts, into said opposite end so as to expand said core member.

20. Apparatus as set forth in claim 15 wherein said means provides a blind bore in the object, and wherein said means further includes means extending inside said core member from a one of said mold parts for selectively expanding said core member.

21. Apparatus as set forth in claim 20 wherein said expanding means includes a piston movable between an engaged position and a disengaged position, and wherein said molding means also includes means for expanding said core member in response to movement of said piston to said engaged position.

* * * * *